United States Patent
Zhang et al.

(10) Patent No.: US 10,123,240 B2
(45) Date of Patent: Nov. 6, 2018

(54) CONTROL OF COMMUNICATION USING DUAL-CONNECTIVITY MODE DESCRIPTION

(71) Applicant: Nokia Solutions and Networks Oy, Espoo (FI)

(72) Inventors: Yan Ji Zhang, Beijing (CN); Yang Liu, Beijing (CN); Tsunehiko Chiba, Saitama (JP)

(73) Assignee: Nokia Solutions and Networks Oy, Espoo (FI)

( * ) Notice: Subject to any disclaimer, the term of this patent is extended or adjusted under 35 U.S.C. 154(b) by 49 days.

(21) Appl. No.: 15/520,058

(22) PCT Filed: Oct. 30, 2014

(86) PCT No.: PCT/CN2014/089944
§ 371 (c)(1),
(2) Date: Apr. 18, 2017

(87) PCT Pub. No.: WO2016/065591
PCT Pub. Date: May 6, 2016

(65) Prior Publication Data
US 2017/0318504 A1   Nov. 2, 2017

(51) Int. Cl.
*H04W 36/00* (2009.01)
*H04W 36/08* (2009.01)
*H04W 36/30* (2009.01)

(52) U.S. Cl.
CPC ... *H04W 36/0055* (2013.01); *H04W 36/0027* (2013.01); *H04W 36/0066* (2013.01); *H04W 36/08* (2013.01); *H04W 36/30* (2013.01)

(58) Field of Classification Search
None
See application file for complete search history.

(56) References Cited

U.S. PATENT DOCUMENTS

2013/0182563 A1* 7/2013 Johansson ............. H04W 76/18
370/228
2014/0302845 A1 10/2014 Kim et al.
(Continued)

OTHER PUBLICATIONS

"New Work Item Description: Dual Connectivity for LTE", 3GPP TSG-RAN meeting #62, RP-132069, Agenda: 13.1.2, NTT DOCOMO, Dec. 3-6, 2013, 7 Pages.
(Continued)

*Primary Examiner* — Charles C Jiang
*Assistant Examiner* — Saad Khawar
(74) *Attorney, Agent, or Firm* — Nokia Technologies Oy

(57) ABSTRACT

An apparatus including at least one processing circuitry, and at least one memory for storing instructions to be executed by the processing circuitry, wherein the at least one memory and the instructions are configured to, with the at least one processing circuitry, cause the apparatus at least: to receive and process a communication connection reestablishment request from a communication element communicating in a multi-connectivity mode, to decide, in case a communication connection with the communication element is established, whether or not the multi-connectivity mode of the communication element is kept, and to cause a transmission of an indication towards a source communication network control element of the communication element, wherein the indication reflects the decision whether or not the multi-connectivity mode of the communication element is kept.

14 Claims, 10 Drawing Sheets

(56) References Cited

U.S. PATENT DOCUMENTS

| | | | |
|---|---|---|---|
| 2016/0192245 A1* | 6/2016 | He | H04W 36/0033 |
| | | | 370/331 |
| 2017/0013668 A1* | 1/2017 | Chang | H04W 76/36 |
| 2017/0134998 A1* | 5/2017 | Xu | H04W 36/0055 |
| 2017/0181044 A1* | 6/2017 | Wen | H04W 36/0005 |

OTHER PUBLICATIONS

"New Study Item Description: Small Cell enhancements for E-UTRA and E-UTRAN—Higher-layer aspects", 3GPP TSG-RAN meeting #58, RP-122033, Agenda: 13.2, NTT DOCOMO, Dec. 4-7, 2012, 5 Pages.

"Report on [85#21][LTE/DC] Basic signalling flows (Samsung)", 3GPP TSG-RAN2 meeting #85, R2-141465, Agenda: 7.2.1, Samsung, Mar. 31-Apr. 4, 2014, 32 Pages.

"3rd Generation Partnership Project; Technical Specification Group Radio Access Network; Evolved Universal Terrestrial Radio Access Network (E-UTRAN); X2 application protocol (X2AP) (Release 12)", 3GPP TS 36.423, V12.2.0, Jun. 2014, pp. 1-151.

"Reestablishment in dual connectivity", 3GPP TSG-RAN Working Group 2 meeting #85bis, R2-141382, Agenda: 7.1.2, Pantech, Mar. 31-Apr. 4, 2014, pp. 1-6.

"Re-establishment in Dual connectivity", 3GPP TSG-RAN Working Group 2 meeting #85bis, R2-141576, Agenda: 7.1.2, Alcatel-Lucent, Mar. 31-Apr. 4, 2014, 2 Pages.

"DRB handling during re-establishment for dual connectivity", 3GPP TSG-RAN Working Group 2 meeting #85bis, R2-141578, Agenda: 7.1.2, Alcatel-Lucent, Mar. 31-Apr. 4, 2014, 4 Pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.2.0, Jun. 2014, pp. 1-365.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2(Release 12)", 3GPP TS 36.300, V12.2.0, Jun. 2014, pp. 1-215.

"Report of 3GPP TSG RAN WG2 meeting #85bis", R2-142941, Agenda Item: 2.2, ETSI MCC, Mar. 31-Apr. 4, 2014, pp. 1-133.

International Search Report and Written Opinion received for corresponding Patent Cooperation Treaty Application No. PCT/CN2014/089944, dated Oct. 30, 2014, 13 pages.

LG Electronics S2-140267: Question on bearer handling for dual connectivity SA WG2 Meeting S2 #101 24, Jan. 24, 2014, 3GPP.

Qualcomm Incorporated R3-140288: Handover Procedures for Dual Connectivity 3GPP TSG-RAN WG3#83, Feb. 14, 2014, 3GPP.

\* cited by examiner

CONTROL OF COMMUNICATION USING DUAL-CONNECTIVITY MODE

RELATED APPLICATION

This application was originally filed as PCT Application No. PCT/CN2014/089944 filed Oct. 30, 2014.

BACKGROUND

Field

The present invention relates to apparatuses, methods, systems, computer programs, computer program products and computer-readable media usable for controlling a communication using multi-connectivity mode, such as a dual connectivity mode.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP $3^{rd}$ Generation Partnership Project
ACK: acknowledgement
BS: base station
CN: core network
CPU: central processing unit
D2D: device to device
DL: downlink
eNB: evolved node B
EPC: extended packet core
ETSI: European Telecommunications Standards Institute
HO: handover
IE: information element
LTE: Long Term Evolution
LTE-A: LTE Advanced
MeNB: master eNB
RLF: radio link failure
RRC: radio resource control
RRM: radio resource management
SCG: secondary cell group
SeNB: secondary eNB
UE: user equipment
UL: uplink Embodiments of the present invention are related to a communication system in which a suitable architecture, procedure and protocol are provided related to a functionality allowing control of a communication using multi-connectivity mode, such as a dual connectivity mode, in case a failure in a reconfiguration procedure or the like occurs.

SUMMARY

According to an example of an embodiment, there is provided, for example, an apparatus including at least one processing circuitry, and at least one memory for storing instructions to be executed by the processing circuitry, wherein the at least one memory and the instructions are configured to, with the at least one processing circuitry, cause the apparatus at least: to receive and process a communication connection reestablishment request from a communication element communicating in a multi-connectivity mode, to decide, in case a communication connection with the communication element is established, whether or not the multi-connectivity mode of the communication element is kept, and to cause a transmission of an indication towards a source communication network control element of the communication element, wherein the indication reflects the decision whether or not the multi-connectivity mode of the communication element is kept.

Furthermore, according to an example of an embodiment, there is provided, for example, a method including receiving and processing a communication connection reestablishment request from a communication element communicating in a multi-connectivity mode, deciding, in case a communication connection with the communication element is established, whether or not the multi-connectivity mode of the communication element is kept, and causing a transmission of an indication towards a source communication network control element of the communication element, wherein the indication reflects the decision whether or not the multi-connectivity mode of the communication element is kept.

According to further refinements, these examples may include one or more of the following features:
  the indication may indicate a communication connection reestablishment attempt caused by one of a radio link failure, a reconfiguration failure or a handover failure in the communication connection of the communication element with the source communication network control element;
  the indication may comprise an indicator having a respective value for informing about keeping or removing of the multi-connectivity mode for the communication element;
  when the decision is to keep the multi-connectivity mode, as the indication, an information element may be introduced informing the source communication network control element that the multi-connectivity for the communication element is to be kept and that a release of a communication element related context in the source communication network control element is to be conducted while a release of the multi-connectivity mode for the communication element is to be omitted;
  a communication connection modification procedure with a secondary communication network control element incorporated in the multi-connectivity mode of the communication element may be started;
  when the decision is to remove the multi-connectivity mode, as the indication, an information element may be introduced informing the source communication network control element that the multi-connectivity for the communication element is to be removed, that a release of a communication element related context in the source communication network control element is to be conducted, and that a release of the multi-connectivity mode for the communication element is to be conducted, or an information element related to the multi-connectivity mode may be omitted;
  the reestablishment request being received and processed may be a radio resource control reestablishment request transmitted by the communication element;
  the processing may be implemented in a communication network control element configured to act as a target node in the communication connection reestablishment by the communication element.

According to an example of an embodiment, there is provided, for example, an apparatus including at least one processing circuitry, and at least one memory for storing instructions to be executed by the processing circuitry, wherein the at least one memory and the instructions are configured to, with the at least one processing circuitry, cause the apparatus at least: to receive and process an indication from a target communication network control element, wherein the indication indicates whether or not a multi-connectivity mode of a communication element making a reestablishment request at the target communication network control element is kept, and to determine, on the basis of the indication, whether the multi-connectivity mode of the communication element is to be kept under the target communication network control element.

Furthermore, according to an example of an embodiment, there is provided, for example, a method including receiving and processing an indication from a target communication network control element, wherein the indication indicates whether or not a multi-connectivity mode of a communication element making a reestablishment request at the target communication network control element is kept, and determining, on the basis of the indication, whether the multi-connectivity mode of the communication element is to be kept under the target communication network control element.

According to further refinements, these examples may include one or more of the following features:
- the indication may indicate a communication connection reestablishment attempt caused by one of a radio link failure, a reconfiguration failure or a handover failure in the communication connection of the communication element with the source communication network control element;
- the indication may comprise an indicator having a respective value for informing about keeping or removing of the multi-connectivity mode for the communication element or lacks an indicator by means of which removing of the multi-connectivity mode for the communication element is indicated;
- when the result of the determination is that the multi-connectivity mode is kept, a local release of a communication element related context may be triggered, and a secondary communication network control element involved in the multi-connectivity mode may be informed about the reestablishment attempt of the communication element;
- a transmission of a reconfiguration complete message including a specific cause code for informing the secondary communication network control element may be caused;
- when the result of the determination is that the multi-connectivity mode is removed, a local release of a communication element related context may be triggered, and a release of the multi-connectivity mode for the communication element may be triggered;
- a transmission of a release request message to a secondary communication network control element involved in the multi-connectivity mode may be caused for triggering a release of the multi-connectivity mode for the communication element, the release request message including a cause value set to a specific value for indicating that the release is caused by a reestablishment of the communication connection of the communication element;
- the processing may be implemented in a communication network control element configured to act as a source node in the communication connection reestablishment by the communication element.

According to an example of an embodiment, there is provided, for example, an apparatus including at least one processing circuitry, and at least one memory for storing instructions to be executed by the processing circuitry, wherein the at least one memory and the instructions are configured to, with the at least one processing circuitry, cause the apparatus at least: to receive and process an information from a source communication network control element about a communication connection reestablishment attempt of a communication element communicating in a multi-connectivity mode, and to recognize from the information that the multi-connectivity mode of the communication element is to be kept, wherein a resource management is optimized on the basis of the information that the multi-connectivity mode of the communication element is kept.

Furthermore, according to an example of an embodiment, there is provided, for example, a method including receiving and processing an information from a source communication network control element about a communication connection reestablishment attempt of a communication element communicating in a multi-connectivity mode, and recognizing from the information that the multi-connectivity mode of the communication element is to be kept, wherein a resource management is optimized on the basis of the information that the multi-connectivity mode of the communication element is kept.

According to further refinements, these examples may include one or more of the following features:
- the information may indicate one of a radio link failure, a reconfiguration failure or a handover failure in the communication connection of the communication element with a source communication network control element;
- the information may be received in a reconfiguration complete message comprising a specific cause value;
- a communication connection modification procedure with a target communication network control element of the communication connection reestablishment by the communication element may be conducted, wherein the multi-connectivity mode may be kept;
- the processing may be implemented in a communication network control element configured to act as a secondary communication network control element involved in the multi-connectivity mode.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
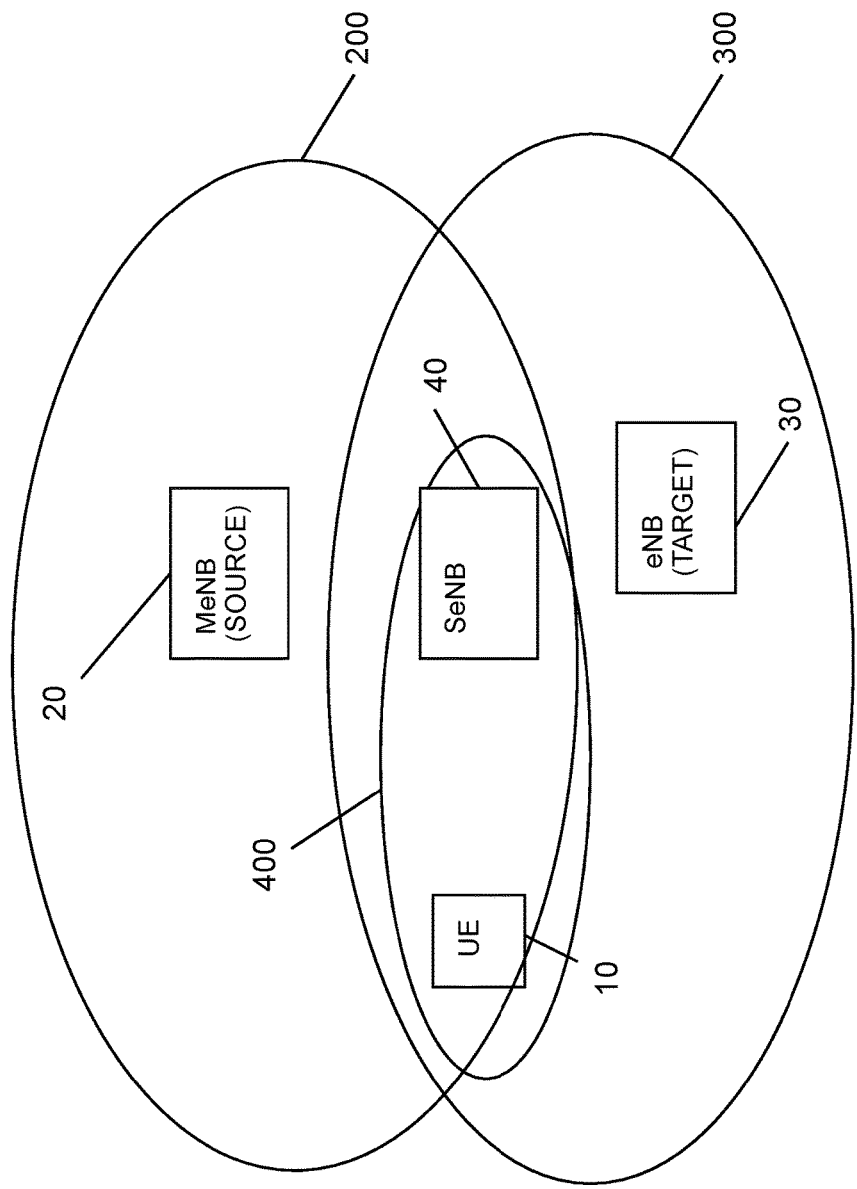
FIG. 1 shows a diagram illustrating a general architecture of a communication system where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) like the Universal Mobile Telecommunications System (UMTS), and fourth generation (4G) communication networks or enhanced communication networks based e.g. on LTE or LTE-A, cellular 2nd generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Embodiments as well as principles described below are applicable to any network element, relay node, server, node, corresponding component, and/or to any communication system or any combination of different communication systems that support required functionalities. The communication system may be a fixed communication system, a wireless communication system or a communication system utilizing both fixed networks and wireless networks. The protocols used, the specifications of communication systems, apparatuses, such as nodes, servers and user terminals, especially in wireless communication, develop rapidly. Such development may require extra changes to an embodiment. Therefore, all words and expressions should be interpreted broadly and they are intended to illustrate, not to restrict, embodiments.

In the following, different exemplifying embodiments will be described using, as an example of an access architecture to which the embodiments may be applied, a radio access architecture based on 3GPP standards, such as a third generation or fourth generation (like LTE or LTE-A) communication network, without restricting the embodiments to such an architecture, however. It is obvious for a person skilled in the art that the embodiments may also be applied to other kinds of communications networks having suitable means by adjusting parameters and procedures appropriately, e.g. WLAN or WiFi, worldwide interoperability for microwave access (WiMAX), Bluetooth®, personal communications services (PCS), ZigBee®, wideband code division multiple access (WCDMA), systems using ultra-wideband (UWB) technology, sensor networks, and mobile ad-hoc networks (MANETs).

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a communication system where examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point or an eNB, which control a respective coverage area or cell(s) and with which one or more communication elements, user devices or terminal devices, such as a UE, or another device having a similar function, such as a modem chipset, a chip, a module etc., which can also be part of an element, function or application capable of conducting a communication, such as a UE, an element or function usable in a machine to machine or D2D communication architecture, or attached as a separate element to such an element, function or application capable of conducting a communication, or the like, are capable to communicate via one or more channels for transmitting several types of data. Furthermore, core network elements such as gateway network elements, policy and charging control network elements, mobility management entities, operation and maintenance elements, and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication element, such as a UE, a communication network control element, such as an eNB, and a communication network besides those described in detail herein below.

A communication network may also be able to communicate with other networks, such as a public switched telephone network or the Internet. The communication network may also be able to support the usage of cloud services. It should be appreciated that network elements of an access system, of a core network etc., and/or respective functionalities may be implemented by using any node, host, server or access node etc. entity suitable for such a usage.

Furthermore, the described network elements, such as communication elements, like a UE, communication network control elements, access network elements etc., like an eNB, etc., as well as corresponding functions as described herein, and other elements, functions or applications may be implemented by software, e.g. by a computer program product for a computer, and/or by hardware. For executing their respective functions, correspondingly used devices, nodes or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a communication network element, network function, or of another entity of the communication network, such as of one or more of radio access network elements like an eNB, may be performed in different entities or functions, such as in a node, host or server, in a flexible manner. In other words, a "division of labor" between involved network elements, functions or entities may vary case by case.

In order to handle the ongoing growth of communication demands and data traffic, operators of communication networks are employing different measures. One example is the employment of so called small cells. Small cells are, for example, low-powered radio access nodes that operate in licensed and unlicensed spectrum and have a smaller range compared to so-called macro cells. Small cells can be used, for example for mobile data offloading by using available radio spectrum more efficiently.

However, it has been found that small cell enhancements may lead, from higher layer aspects, to additional challenges, in particular when a macro cell and small cells are connected via non-ideal backhaul. These challenges comprise mobility robustness, throughput enhancements and increased signaling load due to frequent handover.

To address these challenges, a so-called dual-connectivity approach is considered. Dual connectivity is an operation where a given UE consumes radio resources provided by at least two different network points (also referred to as master and secondary nodes, such as MeNB and SeNB) which are connected with non-ideal backhaul while in RRC CONNECTED state. When the UE is simultaneously connected to MeNB and SeNB, throughput and mobility robustness gains can be achieved. As a baseline assumption for control plane architecture for dual-connectivity, single RRC between MeNB and UE has been agreed.

FIG. 1 shows a diagram illustrating a general architecture of a communication system where dual-connectivity mode is usable so that examples of embodiments of the invention are implementable. It is to be noted that the structure indicated in FIG. 1 shows only those devices, network elements and links which are useful for understanding principles underlying the examples and embodiments of the invention. As also known by those skilled in the art there may be several other network elements or devices involved in a communication in the communication system which are omitted here for the sake of simplicity.

In FIG. 1, a network is shown which form a general basis for an example of a communication system according to some examples of embodiments. Specifically, a (wireless) communication network based for example on a 3GPP specification is depicted where a cellular structure with a plurality of communication areas or cells provide a coverage area in which a communication element, such as a UE, can communicate. It is to be noted that both the number of cells as well as the type thereof as depicted in FIG. 1 are merely intended to provide a basis for illustrating the principles of the control processing according to some examples of embodiments, while each one of the number and type of the involved cells may be different to those shown in FIG. 1.

According to FIG. 1, reference sign 10 denotes a communication element, such as a UE, of a subscriber which represents one terminal point of a communication, i.e. from which UL data packets are transmitted and to which DL data packets are sent.

Reference sign 20 denotes a communication network control element, such as an eNB, which controls a cell 200 in which the UE 10 can communicate. In the example shown in FIG. 1, it is assumed that the eNB 20 acts as a master node for a communication of the UE 10 in a dual-connectivity mode. That is, the eNB 20 is connected to the UE 10 by means of an air interface or the like. Furthermore, the eNB 20 is connected to a core network (not shown).

Reference sign 30 denotes a further communication network control element, such as an eNB, which controls a cell 300 in which the UE 10 can communicate. In the example shown in FIG. 1, it is assumed that the eNB 30 is an alternative access node which can be contacted by the UE 10 for establishing a communication connection (i.e. a target node for a communication connection switching from the MeNB 20, if required, which then represents also a source eNB). That is, the eNB 30 is connectable to the UE 10 by means of an air interface or the like. Furthermore, the eNB 30 is connected to a core network (not shown).

Reference sign 40 denotes a communication network control element, such as an eNB, which controls a cell 400 in which the UE 10 can communicate. In the example shown in FIG. 1, it is assumed that the eNB 40 acts as a secondary node for a communication of the UE 10 in a dual-connectivity mode (i.e. SeNB). For example, the eNB 40 controls a so-called small cell. That is, the SeNB 40 is connected to the UE 10 by means of an air interface or the like. Furthermore, the SeNB 40 may have user plane connection with a core network depending on the data bearer type supported in SeNB (not shown).

Even though it is not shown in FIG. 1, the respective eNBs 20, 30 and 40 may be connected to each other by means of a suitable interface. For example a so-called X2 interface is used in LTE-based networks.

During a communication connection using a dual-connectivity, procedures for modifying, establishing or releasing bearer contexts, for transferring bearer contexts to and from SeNB 40 or for modifying other properties of a UE context at the SeNB 40 may be necessary. This can be accomplished, for example, by applying a modification procedure, also referred to as SeNB modification procedure, which may be either initiated by the MeNB (e.g. MeNB 20) or by the SeNB (e.g. SeNB 40).

A result of a reconfiguration procedure is communicated, for example, by means of a reconfiguration complete procedure. Specifically, in a dual-connectivity scenario, a so-called SeNB reconfiguration complete procedure may be used to indicate either a successful SeNB radio configuration in UE 10 during a SeNB modification procedure, or one of an unsuccessful configuration of the UE with the requested SeNB radio configuration or that the MeNB 20 finally decided to not request the UE 10 to apply the radio configuration requested by the SeNB 40.

It is also possible that UE 10 does not accept a SCG modification. In this case, a reconfiguration failure procedure may be executed by the UE, such as a connection reestablishment procedure. For example, a UE may execute a reestablishment procedure in case of radio access failures, RLF, wrong configuration etc. By means of the reestablishment procedure, it is possible to inform the network about the failure. However, reestablishment procedure also includes a reset/reestablishment of lower layers that that user plane interruptions may occur.

When a reconfiguration is not successful (e.g. in case of an unsuccessful RRC reconfiguration procedure), a suitable control procedure for the network nodes being involved in the dual-connectivity mode, such as the communication network control elements including the MeNB 20, the SeNB 40 and also the (new) eNB 30, is to be implemented.

In the following, one approach for dealing with the above described situation is described as a comparative example. Specifically, the comparative example is based on the idea that when the MeNB receives a reestablishment request from a UE, e.g. an RRC connection reestablishment request, it triggers an SeNB release procedure to remove the dual connectivity functionalities with the SeNB.

Figure 2:
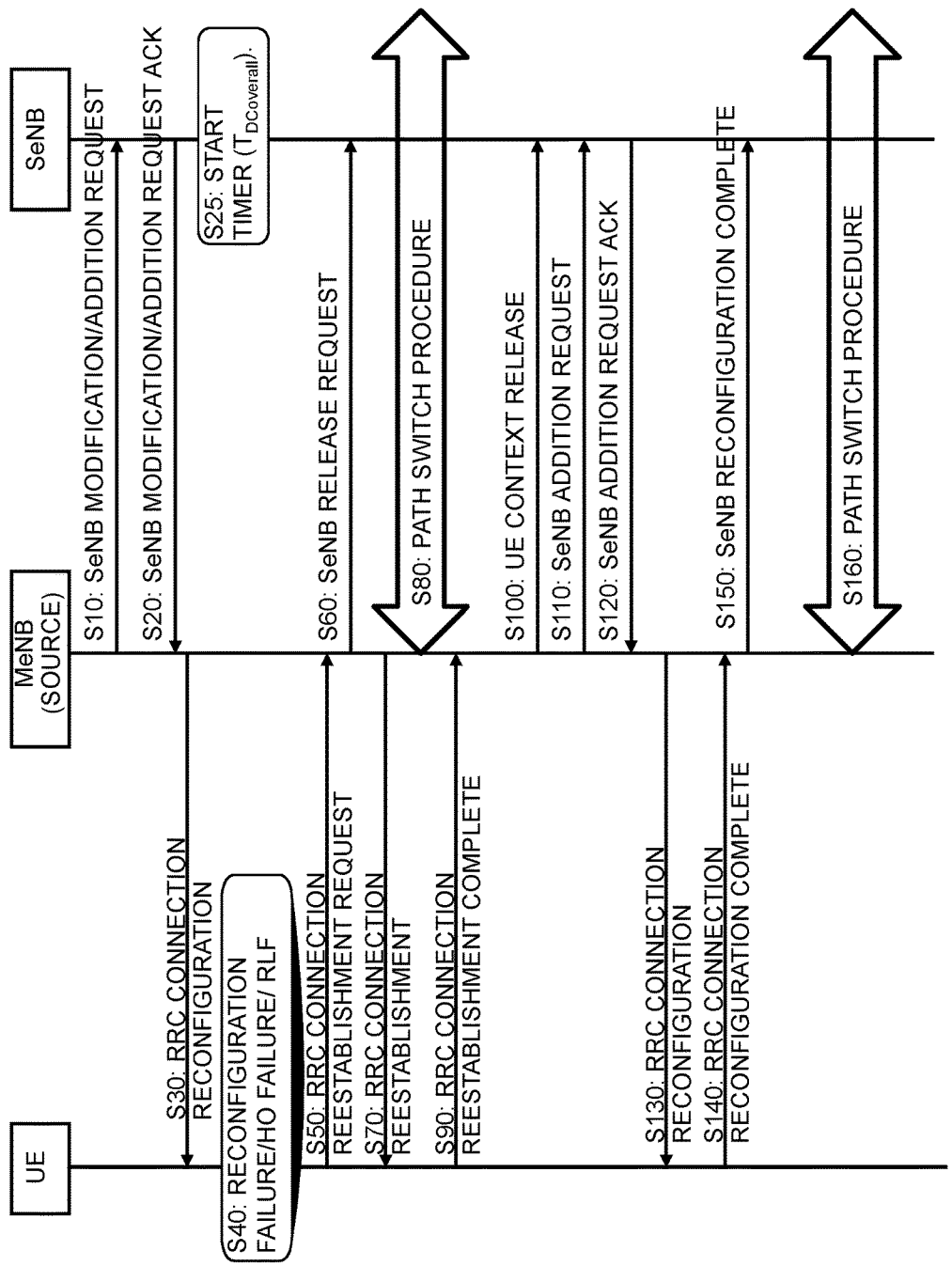
FIG. 2 shows a signaling diagram illustrating a processing according to a comparative example.

FIG. 2 shows a signaling diagram illustrating a corresponding processing according to such a comparative example. Specifically, FIG. 2 is related to a processing according to the above described comparative example where an MeNB executes an SeNB release procedure in case of a reconfiguration failure or the like at a UE.

In S10, the MeNB sends a SeNB modification/addition request to the SeNB, for example in order to negotiate or modify resources, configurations or algorithms in the SeNB related to a communication in the dual-connectivity mode.

In S20, the SeNB answers to the request in S10 by sending a corresponding acknowledgement message, i.e. an SeNB modification/addition ACK.

It is to be noted that the modification procedure may also initiated by the SeNB instead of the MeNB. In this case, additional signaling between SeNB and MeNB would be required.

In S30, the MeNB initiates an RRC connection reconfiguration procedure to the UE 10, e.g. for instructing the UE to configure new bearers to the SeNB, or the like.

Furthermore, in S25, the SeNB starts a timer. Specifically, in case the SeNB admits a modification of a UE context requiring the MeNB to report about the success of a RRC connection reconfiguration procedure, the SeNB starts a timer referred to as $T_{DCoverall}$ when sending the SeNB modification request ACK (or an SeNB addition ACK) to the MeNB. The timer $T_{DCoverall}$ specifies a maximum time in the SeNB for either an SeNB initiated SeNB modification preparation procedure or the protection of the E-UTRAN actions necessary to configure UE resources at SeNB addition or MeNB initiated SeNB modification. The timer $T_{DCoverall}$ is stopped, for example, upon reception of a SeNB reconfiguration complete message (described later). It is to be noted that in case the timer $T_{DCoverall}$ expires before the SeNB has received the SeNB reconfiguration complete (or an SeNB release request) message, the SeNB regards the requested RRC connection reconfiguration as being not applied by the UE and takes further actions like triggering an SeNB initiated SeNB release procedure to release all SeNB resources allocated for the UE in question.

In S40, it is assumed that a failure happens, such as a reconfiguration failure in the MeNB, a reconfiguration failure in the SeNB, a radio link failure, a HO failure, or the like.

Then, in S50, the UE triggers an RRC connection reestablishment procedure by sending an RRC connection reestablishment request to the MeNB.

In response to the RRC connection reestablishment request, according to the comparative example, the MeNB triggers an SeNB release procedure and sends a corresponding request to the SeNB in S60. By means of this, the dual connectivity functionalities with the SeNB are removed. Furthermore, in S70, the RRC connection reestablishment is confirmed by the MeNB to the UE.

In S80, a path switch procedure is conducted in the network for switching a path of data to and from the UE.

In S90, the UE sends a RRC connection reestablishment complete message to the MeNB.

Then, in S100, the MeNB triggers a UE context release procedure at the SeNB in order to remove the UE context data from the SeNB.

In S110, the MeNB initiates a dual-connectivity mode for communication of the UE by sending a SeNB addition request to the SeNB. The SeNB, after checking e.g. availability of resources, acknowledges the SeNB addition request in S120.

Then, the MeNB conducts a (further) RRC connection reconfiguration procedure with the UE in order to establish the dual connectivity mode. For this purpose, a corresponding RRC connection reconfiguration message is sent in S130 to the UE. The UE responds in S140 with a corresponding RRC connection reconfiguration complete message to the MeNB.

In S150, the MeNB sends a SeNB reconfiguration complete message to the SeNB, so that establishment of the dual-connectivity mode can be finalized.

Then, in S160, a further path switching procedure considering the dual-connectivity mode communication is executed in the network.

It is to be noted, however, that the above described procedure may not be optimal. For example, in case the UE is still able to resume the connection with SeNB, it may be an alternative, instead of removing the dual-connectivity by means of the SeNB release, to keep the dual-connectivity after the reestablishment procedure. That is, in the above described example, the SeNB is removed first (see S60), and thereafter the SeNB is added (see S110 ff.). This causes extra signaling overhead in both X2 and S1 access point interfaces and may thus degrade the user performance and burden the network.

Furthermore, it is to be noted that there is no possibility to reflect an actual reason for the actions described in connection with FIG. 2 to the involved network elements or nodes. For example, there is no existing cause value available which can indicate accurately an unsuccessful reconfiguration during the SeNB modification procedure. This however may mislead the RRM in the SeNB.

Consequently, according to examples of embodiments of the invention, there are proposed measures improving the behavior of communication nodes involved in a dual-connectivity mode communication of a UE, such as communication network control elements like eNBs acting as one of a (M)eNB or/and SeNB after a connection reestablishment procedure triggered by an unsuccessful reconfiguration etc., by means of which an impact to the user performance and network load, in particular with regard to a signaling via e.g. the X2/S1 interface, and the performance of UE can be improved. In other words, examples of embodiments of the invention are related to a configuration improving how a reestablishment procedure is operated in a dual-connectivity scenario.

In particular, examples of embodiments of the invention are related to measures that, when a reestablishment procedure is started by the UE 10 and a new eNB (i.e. a communication network control element being different to the current MeNB 20, such as eNB 30) receives a corresponding message, e.g. a RRC connection reestablishment request message, this new eNB starts a SeNB modification procedure to update the UE context in the SeNB if it has the valid UE context and also supports dual connectivity feature; in other words, the dual-connectivity mode is not removed completely.

Specifically, according to examples of embodiments, the new eNB 30 sends an indication, such as a RLF indication, to the MeNB 20 which represents also a source eNB.

The content of the indication depends on a decision of whether or not the dual-connectivity mode is kept. For example, in case the dual connectivity will be continued, the new eNB 30 informs the source MeNB not to trigger any SeNB release procedure but only to start a (local) release procedure for the UE context in MeNB. In this context, a local UE context release procedure results only in a release of the UE context locally at the respective communication network control element (e.g. the source MeNB), while a UE context release in the network is not triggered (i.e. UE context in e.g. a mobility management element (MME) is not removed).

Otherwise, i.e. when the dual-connectivity mode will not be continued, the source MeNB 20 is informed by the new eNB 30 that both the SeNB release procedure and a (local) UE context release procedure are to be conducted so as to remove the resources allocated to the UE 10 in the MeNB 20 and the SeNB 40 completely.

It is to be noted that the SeNB release procedure can also be triggered by the SeNB 40 itself, for example in case a corresponding timer, such as the $T_{DCoverall}$ timer, expires.

Examples of embodiments of the invention concern also protocols and procedures related to signaling between respective network nodes. For example, an interface and corresponding protocols between respective communication network control elements, such as X2 interface between respective eNBs, are configured so as to support the above indicated measures.

For example, in order to provide the respective network nodes with information related to reasons for corresponding actions, such as the reestablishment procedure etc., corresponding cause codes, information elements and/or values are provided. Examples for such a new cause codes, information elements and/or values include e.g. "radio link failure" in order to indicate that the reason for the action is a radio link failure in the MeNB, or "$T_{DCoverall}$ expiry" in order to indicate that the reason of the action is an expiry of the timer $T_{DCoverall}$.

In order to indicate whether or not the dual-connectivity mode is kept by the new eNB after the reestablishment procedure, i.e. in order to indicate whether the dual-connectivity is to be released or not, the indication provided by the new (target) eNB to the (source) MeNB, such as a RLF indication message, may comprise a specific IE added in the RLF indication message. This IE is used, for example, to indicate whether or not the dual-connectivity will be continued with the eNB with which the UE tries to re-establish the connection. In this context, it is to be noted that the reestablishment procedure may be caused by reconfiguration failure, a failed inter-eNB handover, etc.

Specifically, as one example, the IE may be a dual connectivity indicator which has specific values, e.g. true and false, which is included in order to indicate whether the UE will keep the dual-connectivity after the failure case (e.g. the RLF).

That is, according to examples of embodiments of the invention, the communication network control elements, such as the (M)eNBs 20 and 30, are configured to execute the following operations.

The eNB 30 receiving the RRC connection reestablishment request from UE 10 communicating in the dual-connectivity mode sends the RLF indication to the source MeNB 20 so as to indicate an RRC reestablishment attempt caused by e.g. a radio link failure, a reconfiguration failure or a handover failure. In the RLF indication, the dual connectivity indicator is set to a corresponding value depending on whether the dual-connectivity mode it kept.

For example, the dual connectivity indicator is set to a value "true" in case the dual connectivity will be continued with eNB 30. On the other hand, the dual connectivity indicator is set to a value "false" in case the dual-connectivity will be removed. Alternatively, the indication may omit a specific dual connectivity indicator in the message, which is another way to indicate that the dual-connectivity will be removed.

When the MeNB 30 receives the RLF indication, it acts in correspondence with the indication (i.e. the dual connectivity indicator or the absence thereof).

Specifically, in case the dual connectivity indicator is "false" (or the dual connectivity indicator is absent), the MeNB 20 triggers the local UE context release procedure (so as to remove the UE context locally in the MeNB) and the SeNB release procedure.

On the other hand, in case the dual connectivity indicator is "true", the MeNB 20 informs the SeNB 40 about an unsuccessful reconfiguration, RLF, handover failure or the like by setting the cause value to a specific value, e.g. to radio link failure, which is transmitted e.g. in a SeNB reconfiguration complete message. Furthermore, as a release procedure, only the local UE context release procedure is triggered to release the UE context locally in the MeNB (while the SeNB release is omitted). In other words, dual-connectivity is kept.

According to further examples of embodiments, the MeNB 20 selects a proper cause value in e.g. SeNB release request message when triggering the SeNB release procedure. For example, the cause value is set to a value allowing to indicate in an appropriate manner the reason in case the SeNB release procedure is triggered due to the reestablishment procedure. One (not limiting) example may be a cause value indicating "Radio Link Failure", or the like.

As indicated above, the SeNB 40 may also trigger the SeNB release procedure. Also in this case, the SeNB may select a proper cause value in a corresponding SeNB release required message when triggering the SeNB release procedure. For example, a corresponding cause value may be set to "$T_{DCoverall}$ expiry" in case the SeNB release procedure is triggered due to the $T_{DCoverall}$ expiry.

Figure 3:
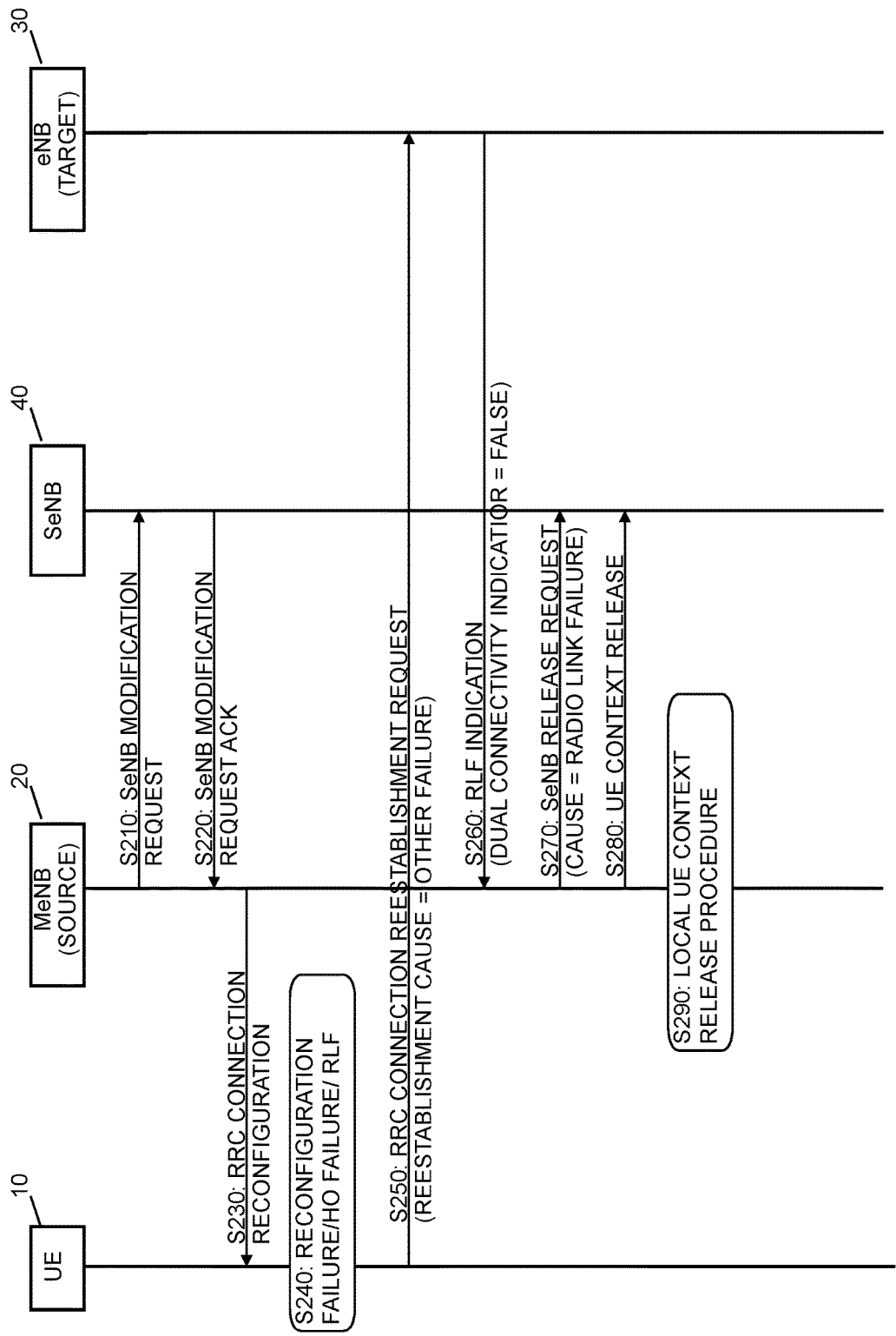
FIG. 3 shows a signaling diagram illustrating a processing according to some examples of embodiments.

FIG. 3 shows a signaling diagram illustrating a processing according to one example of an embodiment based on the above points. Specifically, FIG. 3 is related to a processing according to the above described measures where the connection of UE 10 is reestablished with the new eNB 30 while the dual-connectivity mode of the communication is not kept (i.e. fall-back to a single connectivity mode). It is to be noted that the signaling partners indicated in FIG. 2 are related, for example, to the elements shown in FIG. 1.

In S210, the MeNB 20 sends a SeNB modification request to the SeNB 40, for example in order to modify resources, configurations or algorithms in the SeNB 40 related to a communication in the dual-connectivity mode.

In S220, the SeNB 40 responds to the request in S210 by sending a corresponding acknowledgement message, i.e. an SeNB modification request ACK.

It is to be noted that the modification procedure may also initiated by the SeNB 40 instead of the MeNB 20. In this case, additional signaling between SeNB 40 and MeNB 20 would be required.

In S230, the MeNB 20 initiates an RRC connection reconfiguration procedure to the UE 10, e.g. for instructing the UE to configure new bearers to the SeNB 40, or the like.

In S240, it is assumed that a failure happens, such as a reconfiguration failure in the MeNB 20, a reconfiguration failure in the SeNB 40, a radio link failure, a HO failure, or the like.

Then, in S250, the UE triggers an RRC connection reestablishment procedure by sending an RRC connection reestablishment request to another eNB, such as eNB 30. In other words, when e.g. a RLF or an unsuccessful inter-eNB handover or an unsuccessful RRC reconfiguration happens, the UE 10 performs a RRC connection reestablishment procedure towards another eNB, wherein a proper reestablishment cause is set. The UE 10 may execute a cell selection processing when performing a reestablishment procedure, so as to pick a suitable cell (e.g. that of eNB 30 as quickly as possible).

In response to the RRC connection reestablishment request in S250, according to the present example of an embodiment, the new eNB decides whether or not the dual-connectivity mode is to be kept. In the present case, it is assumed that this decision is negative, i.e. the dual-connectivity mode is to be removed.

Therefore, the eNB 30 sends in S260 a RLF indication to the MeNB 20 which comprises an indicator, such as a dual connectivity indicator, set to the value "false". Alternatively, as described above, the MeNB 20 may consider that the dual connectivity is to be removed in case any dual connectivity indicator is absent in the RLF indication message in S260.

The MeNB 20 determines from the RLF indication and the indicator (or the absence thereof) that the dual-connectivity mode is to be removed. Therefore, the MeNB 20 triggers an SeNB release procedure and sends a corresponding request to the SeNB 40 in S270. By means of this, the dual connectivity functionalities with the SeNB 40 are removed.

Furthermore, in S280, the local UE context release procedure is triggered and the SeNB 40 is informed. As a result, in S290, a local UE context release procedure is executed in the MeNB 20.

Figure 4:
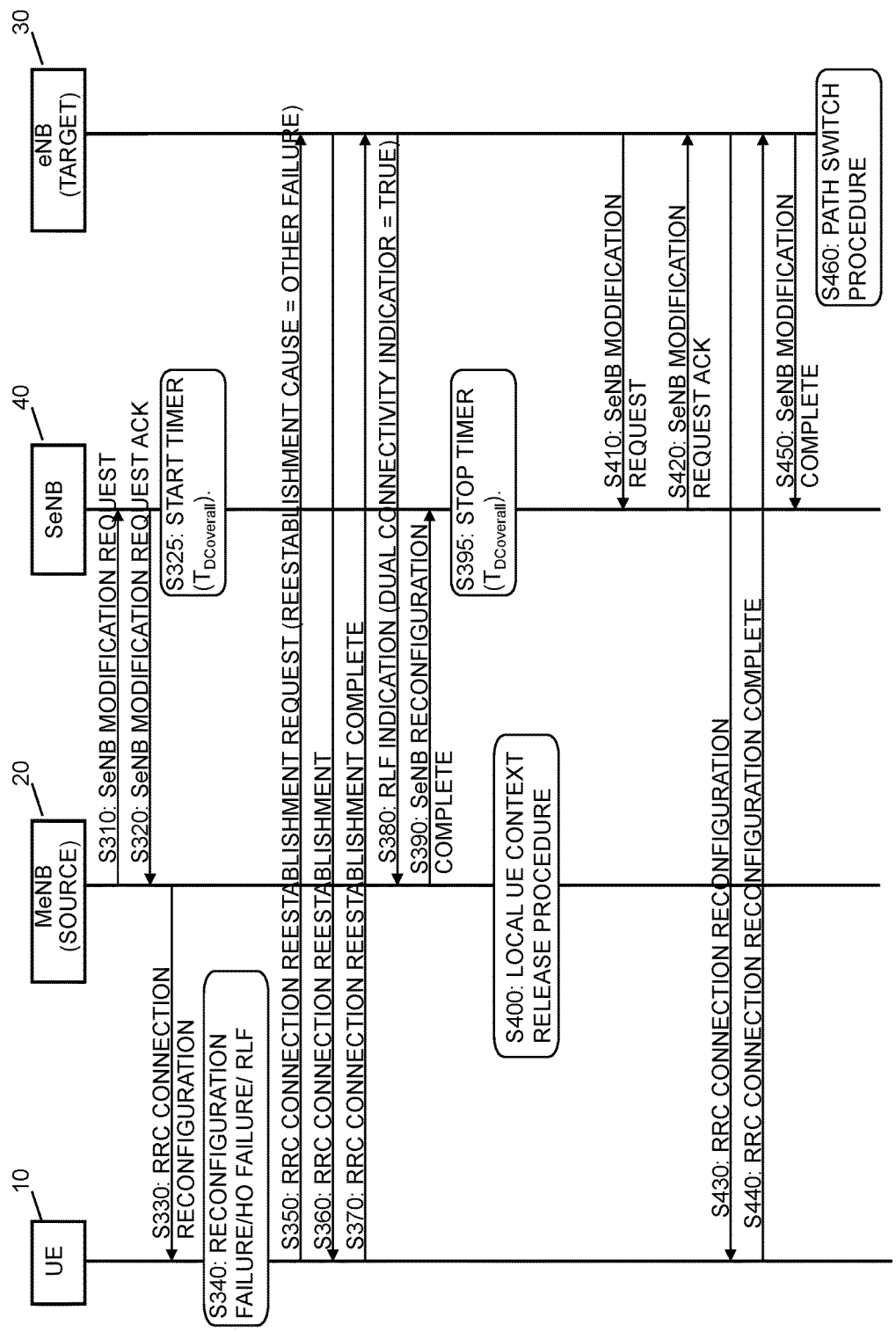
FIG. 4 shows a signaling diagram illustrating a processing according to some examples of embodiments.

FIG. 4 shows a signaling diagram illustrating a processing according to another example of an embodiment based on the above points. Specifically, FIG. 4 is related to a processing according to the above described measures where the connection of UE 10 is reestablished with the new eNB 30 and the dual-connectivity mode of the communication is kept. It is to be noted that the signaling partners indicated in FIG. 3 are related, for example, to the elements shown in FIG. 1.

In S310, the MeNB 20 sends a SeNB modification request to the SeNB 40, for example in order to modify resources, configurations or algorithms in the SeNB 40 related to a communication in the dual-connectivity mode.

In S320, the SeNB 40 responds to the request in S310 by sending a corresponding acknowledgement message, i.e. an SeNB modification request ACK.

It is to be noted that the modification procedure may also initiated by the SeNB 40 instead of the MeNB 20. In this case, additional signaling between SeNB 40 and MeNB 20 would be required.

Furthermore, in S325, the SeNB 40 starts a timer $T_{DCoverall}$ when sending the SeNB modification request ACK (or an SeNB addition ACK) to the MeNB 20.

In S330, the MeNB 20 initiates an RRC connection reconfiguration procedure to the UE 10, e.g. for instructing the UE to configure new bearers to the SeNB 40, or the like.

In S340, it is assumed that a failure happens, such as a reconfiguration failure in the MeNB 20, a reconfiguration failure in the SeNB 40, a radio link failure, a HO failure, or the like.

Then, in S350, the UE triggers an RRC connection reestablishment procedure by sending an RRC connection reestablishment request to another eNB, such as eNB 30. In other words, when e.g. a RLF or an unsuccessful inter-eNB handover or an unsuccessful RRC reconfiguration happens, the UE 10 performs a RRC connection reestablishment procedure towards another eNB, wherein a proper reestablishment cause is set. The UE 10 may execute a cell selection processing when performing a reestablishment procedure, so as to pick a suitable cell (e.g. that of eNB 30 as quickly as possible).

In response to the RRC connection reestablishment request in S350, according to the present example of an embodiment, the new eNB decides whether or not the dual-connectivity mode is to be kept. In the present case, it is assumed that this decision is positive, i.e. the dual-connectivity mode is kept.

In S360, the new eNB 30 sends a RRC connection reestablishment signalling to the UE 10. The UE 10 responds in S370 with a RRC connection reestablishment complete message.

In S380, the new eNB 30 sends a RLF indication to the MeNB 20 which comprises an indicator, such as a dual connectivity indicator, set to the value "true".

The MeNB 20 determines from the RLF indication and the indicator that the dual-connectivity mode is kept. Therefore, the MeNB 20 sends in S390 a SeNB reconfiguration complete message to the SeNB 40 so as to inform the SeNB 40 about the reestablishment attempt by the UE 10 and that the dual-connectivity mode for the UE 10 is kept. By means of this, the dual connectivity functionalities with the SeNB 40 are maintained. Furthermore, the MeNB 20 triggers a local UE context release procedure conducted in S400 to remove UE context in MeNB 20.

It is to be noted that in S395 the timer $T_{DCoverall}$ is stopped since the SeNB reconfiguration complete message is received in S390.

In S410, in order to keep the dual-connectivity, the new eNB 30 triggers a SeNB modification procedure by sending a corresponding request to the SeNB 40.

In S420, the SeNB 40, after checking for example available resources, sends an acknowledgement to the request in S410 back to the new (target) eNB 30.

Then, in S430, the new eNB 30 sends an RRC connection reconfiguration message to the UE 10 for initiating a corresponding reconfiguration in the UE 10. The UE 10 responds to the request in S430 by a RRC connection reconfiguration complete message in S440, which is sent to the new eNB 30.

After receiving the RRC connection reconfiguration complete message from the UE 10, the new eNB 30 finalizes the SeNB modification procedure by sending a SeNB modification complete message to the SeNB 40 in S450. Then, in S460, path switching procedure is executed in the network. Consequently, a new MeNB (i.e. the new eNB 30) is accepted by the SeNB 40 to be in charge of the dual connectivity mode communication of UE 10, which was related beforehand to MeNB 20.

Figure 5:
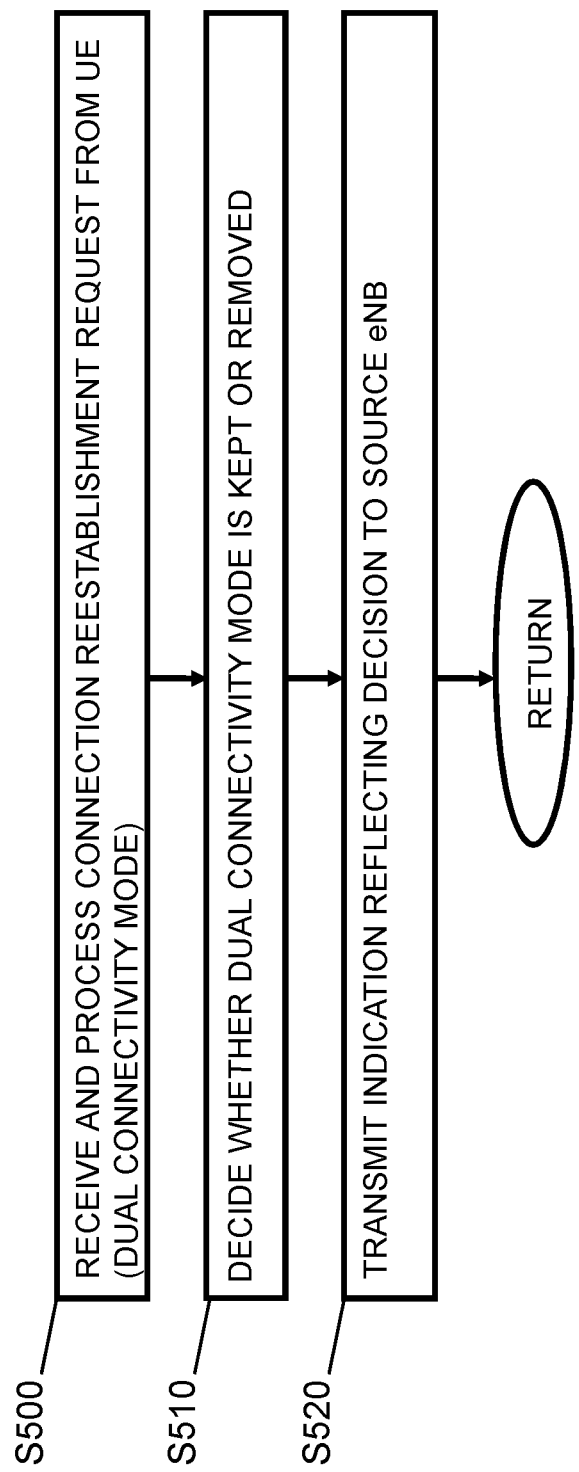
FIG. 5 shows a flow chart of a processing conducted in a communication network control element or function according to some examples of embodiments.

FIG. 5 shows a flow chart of a processing conducted in a communication network control function which receives a reestablishment request, such as the RRC Connection Reestablishment request from a UE in dual connectivity mode according to some examples of embodiments. Specifically, the example according to FIG. 5 is related to a processing conducted by the communication node acting as a (target) eNB (e.g. eNB 30) in the communication network as depicted e.g. in FIG. 1.

In S500, a communication connection reestablishment request is received and processed from a communication element, such as UE 10, which communicates in a dual-connectivity mode. For example, according to examples of embodiments, the reestablishment request being received and processed is a RRC reestablishment request transmitted by the UE due to one of a radio link failure, a reconfiguration failure or a handover failure. The processing may include, for example, a procedure in which it is decided whether a communication connection with the requesting UE is to be established.

In S510, it is decided, in case a communication connection with the communication element is established, whether or not the dual-connectivity mode of the communication element is kept. As described above, this may be based on capabilities of the deciding network node, a traffic situation etc.

In S520, an indication is transmitted towards a source communication network control element of the UE 10, e.g. towards the MeNB 20. The indication reflects the decision in S510, i.e. whether or not the dual-connectivity mode of the UE 10 is kept when the communication connection is established with the new eNB.

According to examples of embodiments, the indication indicates that there is a communication connection reestablishment attempt caused by one of a radio link failure, a reconfiguration failure or a handover failure in the communication connection of the UE with the source eNB. Furthermore, according to some examples of embodiments, the indication comprises an indicator (e.g. the dual connectivity indicator described above) having a respective value (e.g. true or false) for informing about keeping or removing of the dual-connectivity mode for the UE.

Depending on the decision made in S510, the indication in S520 is introduced in varying manners. For example, when the decision in S510 is to keep the dual-connectivity mode, an information element is introduced as the indication, which informs the source eNB that the dual-connectivity for the UE is to be kept and that a local release of a UE context in the source eNB is to be conducted. On the other hand, the information element informs also that a release of the dual-connectivity mode for the UE is not to be executed, i.e. to be omitted.

According to further examples of embodiments, when the decision in S510 is to keep the dual-connectivity mode, a processing for starting a communication connection modification procedure with a secondary communication network control element (e.g. SeNB 40), which is incorporated in the dual-connectivity mode of the UE 10 (i.e. to which the second communication connection in parallel to the first communication connection to the source eNB exists for forming the dual connectivity), is executed.

On the other hand, when the decision in S510 is to remove the dual-connectivity mode, an information element is introduced as the indication, which informs the source eNB that the dual-connectivity for the UE is to be removed. That means, it is indicated that a local release of a UE context in the source eNB is to be conducted, and that a release of the dual-connectivity mode for the communication element is to be conducted (i.e. an SeNB release procedure). According to further examples of embodiments, the indication is provided in another manner, i.e. by omitting any information element related to the dual-connectivity mode, which is interpretable by the receiving side (the MeNB 20) in a corresponding manner.

Figure 6:
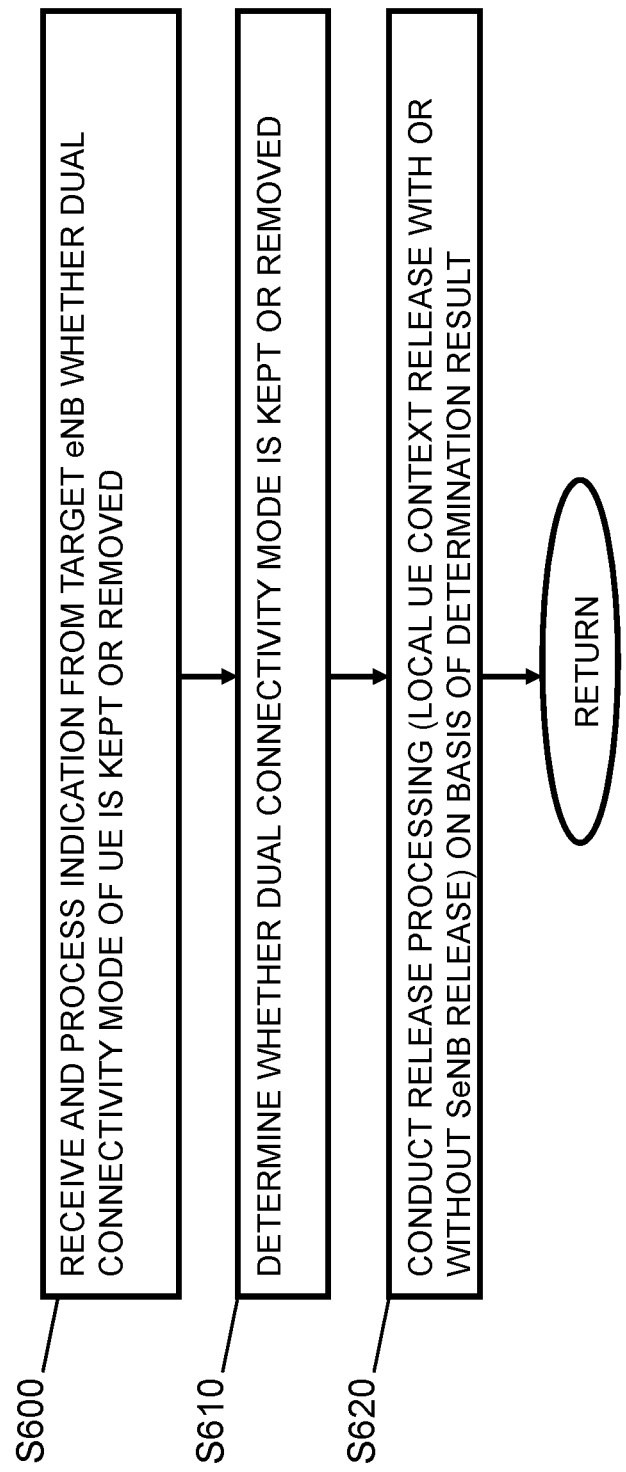
FIG. 6 shows a flow chart of a processing conducted in a communication network control element or function according to some examples of embodiments.

FIG. 6 shows a flow chart of a processing conducted in a communication network control function which is a master communication network control element for a communication connection of a UE in a dual-connectivity mode according to some examples of embodiments. Specifically, the example according to FIG. 6 is related to a processing conducted by the communication node acting as a (source) eNB in the communication network as depicted e.g. in FIG. 1.

In S600, an indication from a target communication network control element (such as the eNB 30) is received and processed. The indication indicates whether or not a dual-connectivity mode of a UE making a reestablishment request at the target eNB is kept.

According to examples of embodiments, the indication indicates a communication connection reestablishment attempt, e.g. caused by one of a radio link failure, a reconfiguration failure or a handover failure in the communication connection of the UE with the source eNB. For example, the indication comprises an indicator (e.g. the dual connectivity indicator described above) having a respective value (e.g. true or false) for informing about keeping or removing of the dual-connectivity mode for the UE. Alternative, it is also possible according to some examples of embodiments that there is no indicator included by means of which removing of the dual-connectivity mode for the US is indicated.

In S610, it is determined, on the basis of the indication of S600, whether the dual-connectivity mode of the US is to be kept under the target eNB. This is done, for example, by checking whether the indicator indicates true or false.

In S620, as one example of a result of the determination in S610, a release processing related to the UE is conducted on the basis of a result of the determination in S610. The release processing may include different processing depending on the determination.

For example, when the result of the determination is that the dual-connectivity mode is kept, only a local release of a UE context is triggered. Furthermore, a secondary communication network control element (e.g. SeNB 40) which is involved in the dual-connectivity mode (i.e. to which the second communication connection in parallel to the first communication connection to the source eNB exists for forming the dual connectivity), is informed about the reestablishment attempt of the UE. According to some examples of embodiments, a reconfiguration complete message including a specific cause code for informing the secondary communication network control element is transmitted.

On the other hand, when the result of the determination in S610 is that the dual-connectivity mode is removed, a local release of a UE context is triggered, and a release of the dual-connectivity mode for the UE is triggered (i.e. a SeNB release procedure). For example, for triggering a release of the dual-connectivity mode for the UE, a release request message is transmitted to the SeNB 40, wherein the release request message includes a cause value set to a specific value for indicating that the release is caused by a reestablishment of the communication connection of the UE.

Figure 7:
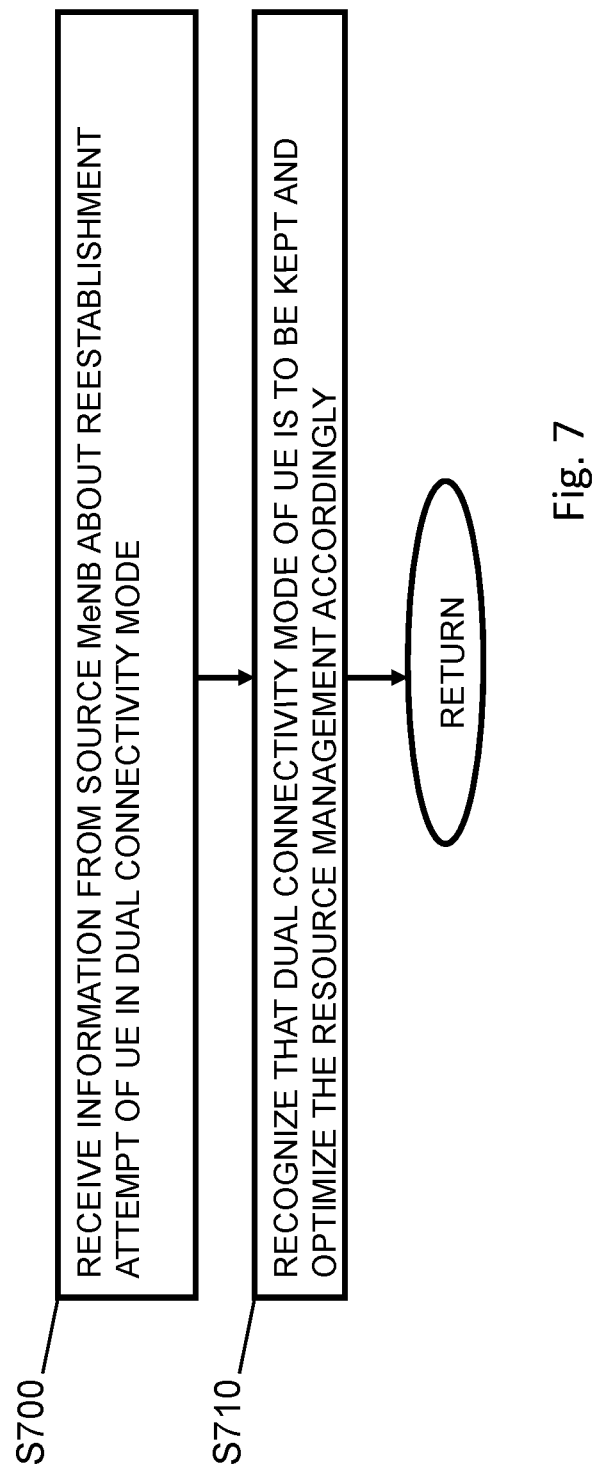
FIG. 7 shows a flow chart of a processing conducted in a communication network control element or function according to some examples of embodiments.

FIG. 7 shows a flow chart of a processing conducted in a communication network control function which is involved in the dual-connectivity mode of the UE according to some examples of embodiments. Specifically, the example according to FIG. 7 is related to a processing conducted by the communication node acting as a secondary eNB (SeNB) in the communication network as depicted e.g. in FIG. 1.

In S700, information from a source communication network control element about a communication connection reestablishment attempt of a UE communicating in a dual-connectivity mode is received and processed. For example, the information indicates one of a radio link failure, a reconfiguration failure or a handover failure in the communication connection of the communication element with a source communication network control element. Furthermore, according to examples of embodiments, the information is received in a reconfiguration complete message comprising a specific cause value.

In S710, it is recognized from the information that the dual-connectivity mode of the UE is to be kept wherein a resource management is optimized accordingly. For example, according to examples of embodiments, a communication connection modification procedure with a target communication network control element of the communication connection reestablishment by the UE is prepared and conducted, wherein the dual-connectivity mode is kept. That is, a new MeNB (i.e. the new eNB 30) is accepted to be in charge of the dual connectivity mode communication of UE 10, which was related beforehand to MeNB 20.

Figure 8:
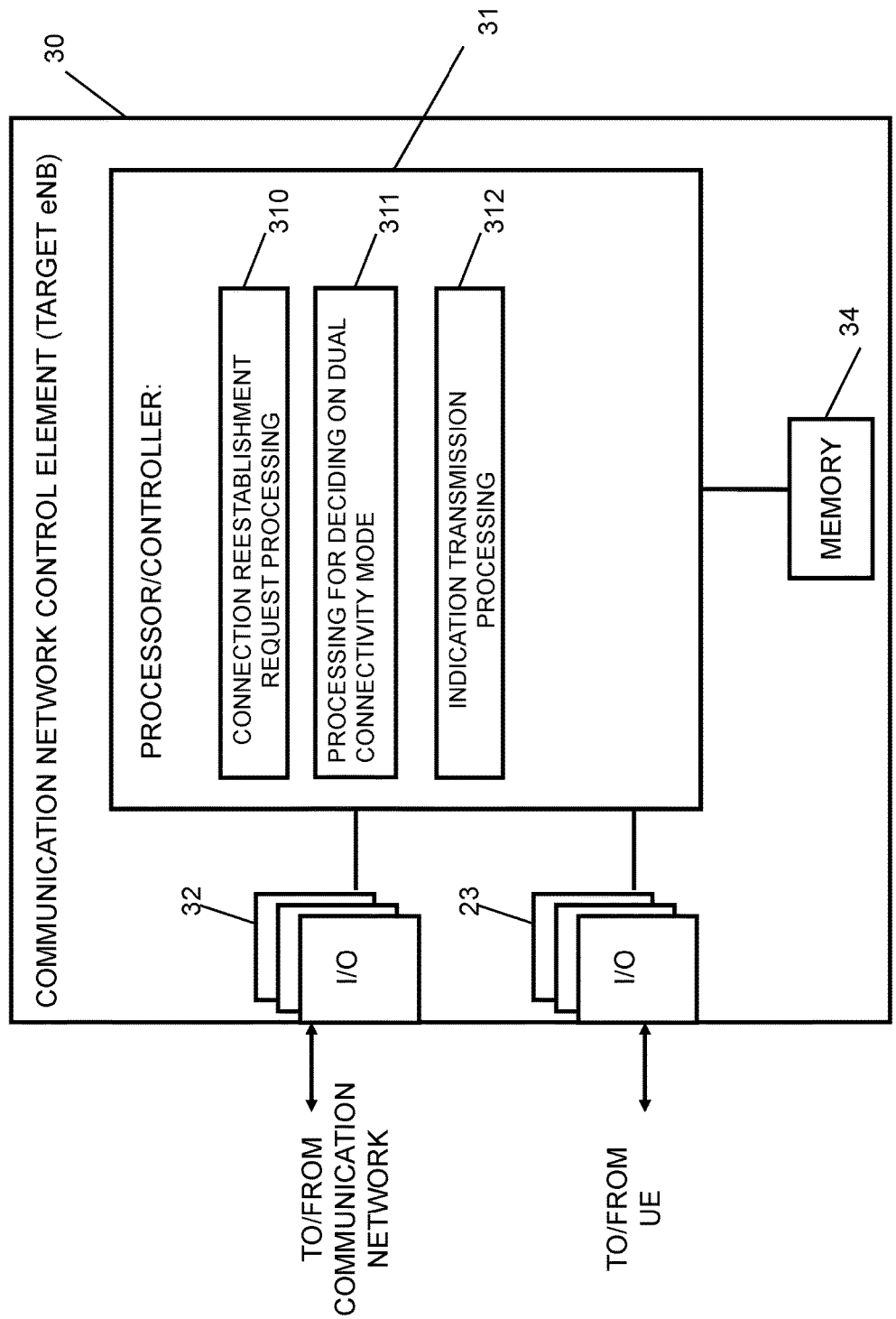
FIG. 8 shows a diagram of a network element acting as a target communication network control element according to some examples of embodiments.

FIG. 8 shows a diagram of a network element acting as a target communication network control element according to some examples of embodiments, which is configured to implement a control procedure as described in connection with some of the examples of embodiments. It is to be noted that the network element, like the eNB 30, which is shown in FIG. 8, may include further elements or functions besides those described herein below. Furthermore, even though reference is made to a communication network control element or node, the element or node may also be another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 8 may include a processing circuitry, a processing function, a control unit or a processor 31, such as a CPU or the like, which is suitable for executing instructions given by programs or the like related to the control procedure. The processor 31 may include one or more processing portions or functions dedicated to specific processing as described below, or the processing may be run in a single processor or processing function. Portions for executing such specific processing may also be provided as discrete elements or within one or more further processors, processing functions or processing portions, such as in one physical processor like a CPU or in one or more physical or virtual entities, for example. Reference signs 32 and 33 denote transceiver or input/output (I/O) units or functions (interfaces) connected to the processor or processing function 31. The I/O units 32 may be used for communicating with a communication network, such as a core network or other communication network control elements, like the eNB 20. The I/O units 33 may be used for communicating with a communication element such as UE 10. The I/O units 32 and 33 may be a combined unit including communication equipment towards several network elements, or may include a distributed structure with a plurality of different interfaces for different network elements. Reference sign 34 denotes a memory usable, for example, for storing data and programs to be executed by the processor or processing function 31 and/or as a working storage of the processor or processing function 31. It is to be noted that the memory 34 may be implemented by using one or more memory portions of the same or different type of memory.

The processor or processing function 31 is configured to execute processing related to the above described control procedure. In particular, the processor or processing circuitry or function 31 includes one or more of the following sub-portions. Sub-portion 310 is a processing portion which is usable for processing a connection reestablishment request. The portion 310 may be configured to perform processing according to S500 of FIG. 5. Moreover, the processor or processing circuitry or function 31 may include a sub-portion 311 usable as a portion for deciding on whether or not a dual-connectivity mode is kept. The portion 311 may be configured to perform processing according to S510 of FIG. 5. Furthermore, the processor or processing circuitry or function 31 may include a sub-portion 312 usable as a portion for preparing and transmitting an indication. The portion 312 may be configured to perform a processing according to S520 of FIG. 5.

Figure 9:
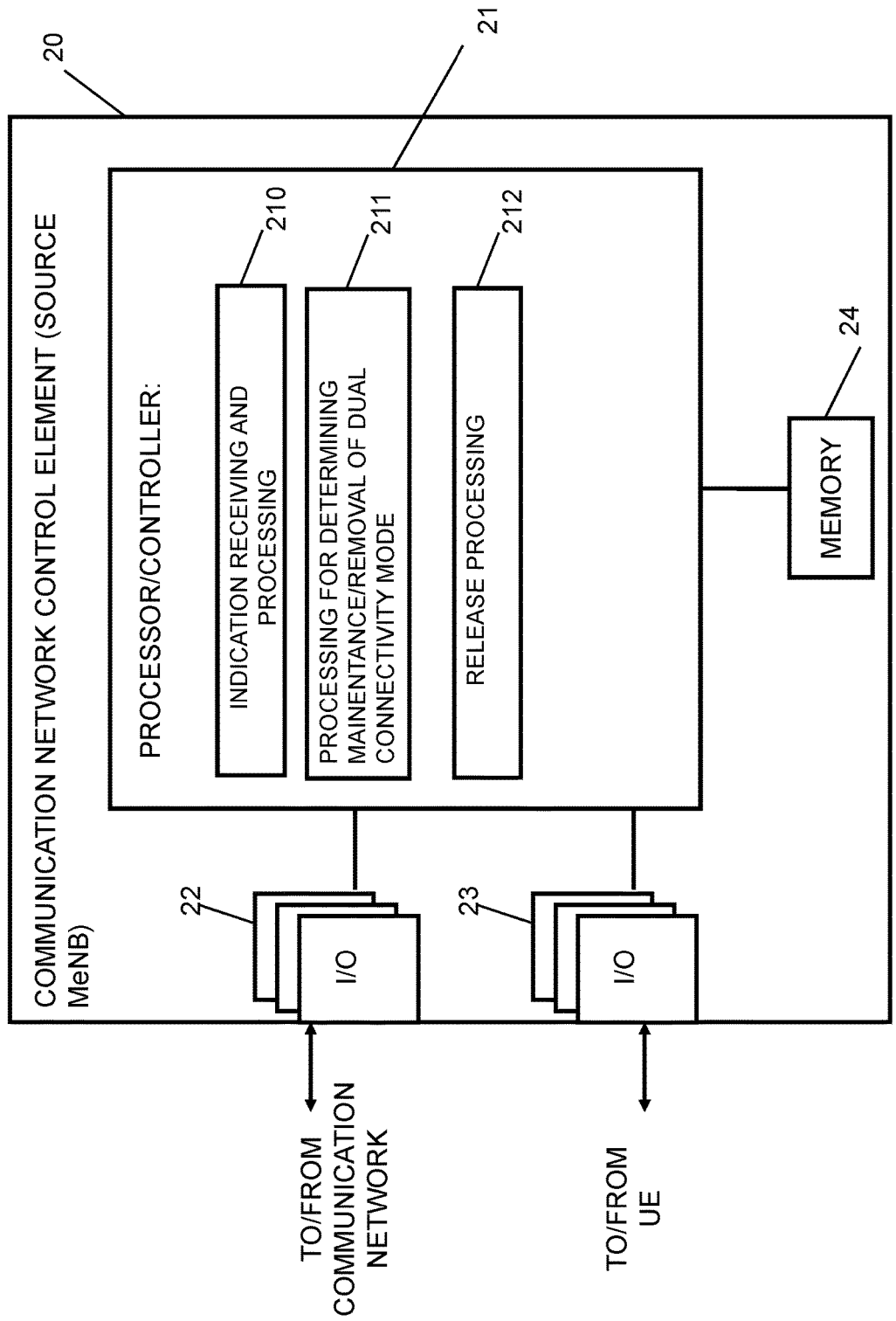
FIG. 9 shows a diagram of a network element acting as a source communication network control element according to some examples of embodiments.

FIG. 9 shows a diagram of a network element acting as a source communication network control element according to some examples of embodiments, which is configured to implement a control procedure as described in connection with some of the examples of embodiments. It is to be noted that the network element, like the eNB 20, which is shown in FIG. 8, may include further elements or functions besides those described herein below. Furthermore, even though reference is made to a communication network control element or node, the element or node may also be another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 9 may include a processing circuitry, a processing function, a control unit or a processor 21, such as a CPU or the like, which is suitable for executing instructions given by programs or the like related to the control procedure. The processor 21 may include one or more processing portions or functions dedicated to specific processing as described below, or the processing may be run in a single processor or processing function. Portions for executing such specific processing may also be provided as discrete elements or within one or more further processors, processing functions or processing portions, such as in one physical processor like a CPU or in one or more physical or virtual entities, for example. Reference signs 22 and 23 denote transceiver or input/output (I/O) units or functions (interfaces) connected to the processor or processing function 21. The I/O units 22 may be used for communicating with a communication network, such as a core network or other communication network control elements, like the eNB 30. The I/O units 23 may be used for communicating with a communication element such as UE 10. The I/O units 22 and 23 may be a combined unit including communication equipment towards several network elements, or may include a distributed structure with a plurality of different interfaces for different network elements. Reference sign 24 denotes a memory usable, for example, for storing data and programs to be executed by the processor or processing function 21 and/or as a working storage of the processor or processing function 21. It is to be noted that the memory 24 may be implemented by using one or more memory portions of the same or different type of memory.

The processor or processing function 21 is configured to execute processing related to the above described control procedure. In particular, the processor or processing circuitry or function 21 includes one or more of the following sub-portions. Sub-portion 210 is a processing portion which is usable for receiving and processing an indication as defined above. The portion 210 may be configured to perform processing according to S600 of FIG. 6. Moreover, the processor or processing circuitry or function 21 may include a sub-portion 211 usable as a portion for determining maintenance or removal of the dual-connectivity mode. The portion 211 may be configured to perform processing according to S610 of FIG. 6. Furthermore, the processor or processing circuitry or function 21 may include a sub-portion 212 usable as a portion for conducting a respective release procedure. The portion 212 may be configured to perform a processing according to S620 of FIG. 6.

Figure 10:
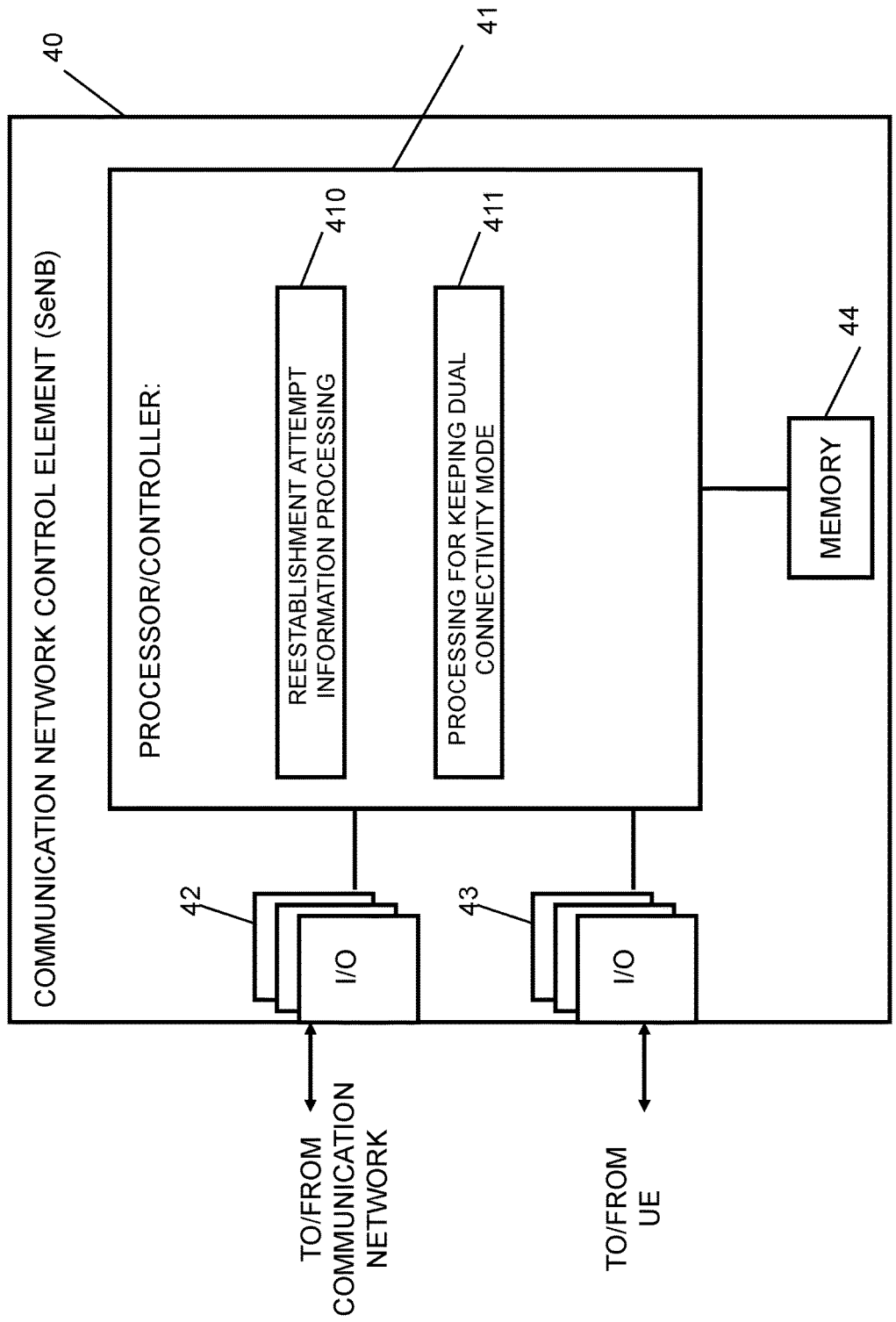
FIG. 10 shows a diagram of a network element acting as a secondary communication network control element according to some examples of embodiments.

FIG. 10 shows a diagram of a network element acting as a secondary communication network control element according to some examples of embodiments, which is configured to implement a control procedure as described in connection with some of the examples of embodiments. It is to be noted that the network element, like the SeNB 40, which is shown in FIG. 10, may include further elements or functions besides those described herein below. Furthermore, even though reference is made to a communication network control element or node, the element or node may also be another device or function having a similar task, such as a chipset, a chip, a module, an application etc., which can also be part of a communication network control element or attached as a separate element to a communication network control element, or the like. It should be understood that each block and any combination thereof may be implemented by various means or their combinations, such as hardware, software, firmware, one or more processors and/or circuitry.

The communication network control element shown in FIG. 10 may include a processing circuitry, a processing function, a control unit or a processor 41, such as a CPU or the like, which is suitable for executing instructions given by programs or the like related to the control procedure. The processor 41 may include one or more processing portions or functions dedicated to specific processing as described below, or the processing may be run in a single processor or processing function. Portions for executing such specific processing may also be provided as discrete elements or within one or more further processors, processing functions or processing portions, such as in one physical processor like a CPU or in one or more physical or virtual entities, for example. Reference signs 42 and 43 denote transceiver or input/output (I/O) units or functions (interfaces) connected to the processor or processing function 41. The I/O units 42 may be used for communicating with a communication network, such as a core network or other communication network control elements, like the eNB 30. The I/O units 43 may be used for communicating with a communication element such as UE 10. The I/O units 42 and 43 may be a combined unit including communication equipment towards several network elements, or may include a distributed structure with a plurality of different interfaces for different network elements. Reference sign 44 denotes a memory usable, for example, for storing data and programs to be executed by the processor or processing function 41 and/or as a working storage of the processor or processing function 41. It is to be noted that the memory 44 may be implemented by using one or more memory portions of the same or different type of memory.

The processor or processing function 41 is configured to execute processing related to the above described control procedure. In particular, the processor or processing circuitry or function 41 includes one or more of the following sub-portions. Sub-portion 410 is a processing portion which is usable for processing information related to a reestablishment attempt of the UE. The portion 410 may be configured to perform processing according to S700 of FIG. 7. Moreover, the processor or processing circuitry or function 41 may include a sub-portion 411 usable as a portion for recognizing that the dual-connectivity mode is kept. The portion 411 may be configured to perform processing according to S710 of FIG. 7.

It is to be noted that even though in the above described examples of embodiments a dual-connectivity mode is described, embodiments of the invention are not limited to such a communication mode. For example, connectivity to more than two network nodes may be established, i.e. a multi-connectivity mode may be implemented.

According to further examples of embodiments, there is provided an apparatus including means for receiving and processing a communication connection reestablishment request from a communication element communicating in a multi-connectivity mode, means for deciding, in case a communication connection with the communication element is established, whether or not the multi-connectivity mode of the communication element is kept, and means for causing a transmission of an indication towards a source communication network control element of the communication element, wherein the indication reflects the decision whether or not the multi-connectivity mode of the communication element is kept.

Moreover, according to further examples of embodiments, there is provided an apparatus including means for receiving and processing an indication from a target communication network control element, wherein the indication indicates whether or not a multi-connectivity mode of a communication element making a reestablishment request at the target communication network control element is kept, and means for determining, on the basis of the indication, whether the multi-connectivity mode of the communication element is to be kept under the target communication network control element.

In addition, according to further examples of embodiments, there is provided an apparatus including means for receiving and processing an information from a source communication network control element about a communication connection reestablishment attempt of a communication element communicating in a multi-connectivity mode, and means for recognizing from the information that the multi-connectivity mode of the communication element is to be kept, wherein a resource management is optimized on the basis of the information that the multi-connectivity mode of the communication element is kept.

By means of the measures described in the above examples of embodiments, it is possible to achieve a suitable control of a communication using multi-connectivity mode, such as a dual-connectivity mode, in case a failure in a reconfiguration procedure or the like occurs. Specifically, with the proposed measures, by identifying for example different cause value or the reestablishment cause, the MeNB and SeNB are able to perform appropriate actions which can be used to keep the dual-connectivity mode, so that the dual connectivity performance can be improved and a potential signaling overhead over network interfaces (such as X2/S1 in LTE networks) in case of a reconfiguration failure happening can be reduced.

It should be appreciated that an access technology via which signaling is transferred to and from a network element may be any suitable present or future technology, such as WLAN (Wireless Local Access Network), WiMAX (Worldwide Interoperability for Microwave Access), LTE, LTE-A, Bluetooth, Infrared, and the like may be used; additionally, embodiments may also apply wired technologies, e.g. IP based access technologies like cable networks or fixed lines.

a user device (also called UE, user equipment, user terminal, terminal device, etc.) illustrates one type of an apparatus to which resources on the air interface may be allocated and assigned, and thus any feature described herein with a user equipment may be implemented with a corresponding apparatus, such as a relay node. An example of such a relay node is a layer 3 relay (self-backhauling relay) towards a base station or eNB. The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network, or a nearly exclusive downlink only device, such as a portable video player. Also equipment used for measuring certain values, such as sensors which can measure a temperature, a pressure etc., can be used as a corresponding user device. It should be appreciated that a device may be regarded as an apparatus or as an assembly of more than one apparatus, whether functionally in cooperation with each other or functionally independently of each other but in a same device housing.

embodiments suitable to be implemented as software code or portions of it and being run using a processor or processing function are software code independent and can be specified using any known or future developed programming language, such as a high-level programming language, such as objective-C, C, C++, C#, Java, etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus including
at least one processing circuitry,
and
at least one memory for storing instructions to be executed by the processing circuitry, wherein
the at least one memory and the instructions are configured to, with the at least one processing circuitry, cause the apparatus at least:
to receive and process a communication connection reestablishment request from a communication element communicating in a multi-connectivity mode,
to decide, in case a communication connection with the communication element is established, whether or not the multi-connectivity mode of the communication element is kept,
to cause a transmission of an indication towards a source communication network control element of the communication element, wherein the indication reflects the decision whether or not the multi-connectivity mode of the communication element is kept, and
when the decision is to keep the multi-connectivity mode, to introduce, as the indication, an information element informing the source communication network control element that the multi-connectivity for the communication element is to be kept and that a release of a communication element related context in the source communication network control element is to be conducted while a release of the multi-connectivity mode for the communication element is to be omitted.

2. The apparatus according to claim 1, wherein the indication indicates a communication connection reestablishment attempt caused by one of a radio link failure, a reconfiguration failure or a handover failure in the communication connection of the communication element with the source communication network control element.

3. The apparatus according to claim 1, wherein the indication comprises an indicator having a respective value for informing about keeping or removing of the multi-connectivity mode for the communication element.

4. The apparatus according to claim 1, wherein the at least one memory and the instructions are further configured to, with the at least one processing circuitry, cause the apparatus at least:
to start a communication connection modification procedure with a secondary communication network control element incorporated in the multi-connectivity mode of the communication element.

5. The apparatus according to claim 1, wherein the at least one memory and the instructions are further configured to, with the at least one processing circuitry, cause the apparatus at least:
when the decision is to remove the multi-connectivity mode,
to introduce, as the indication, an information element informing the source communication network control element that the multi-connectivity for the communication element is to be removed, that a release of a communication element related context in the source communication network control element is to be conducted, and that a release of the multi-connectivity mode for the communication element is to be conducted, or
to omit an information element related to the multi-connectivity mode.

6. The apparatus according to claim 1, wherein the reestablishment request being received and processed is a radio resource control reestablishment request transmitted by the communication element.

7. The apparatus according to claim 1, wherein the apparatus is included in a communication network control element configured to act as a target node in the communication connection reestablishment by the communication element.

8. An apparatus including
at least one processing circuitry,
and
at least one memory for storing instructions to be executed by the processing circuitry, wherein
the at least one memory and the instructions are configured to, with the at least one processing circuitry, cause the apparatus at least:
to receive and process an indication from a target communication network control element, wherein the indication indicates whether or not a multi-connectivity mode of a communication element making a reestablishment request at the target communication network control element is kept,
to determine, on the basis of the indication, whether the multi-connectivity mode of the communication element is to be kept under the target communication network control element, and
when the result of the determination is that the multi-connectivity mode is kept, to trigger a local release of a communication element related context, and to inform a secondary communication network control element involved in the multi-connectivity mode about the reestablishment attempt of the communication element.

9. The apparatus according to claim 8, wherein the indication indicates a communication connection reestablishment attempt caused by one of a radio link failure, a reconfiguration failure or a handover failure in the communication connection of the communication element with the source communication network control element.

10. The apparatus according to claim 8, wherein the indication comprises an indicator having a respective value for informing about keeping or removing of the multi-connectivity mode for the communication element or lacks an indicator by means of which removing of the multi-connectivity mode for the communication element is indicated.

11. The apparatus according to claim 8, wherein the at least one memory and the instructions are further configured to, with the at least one processing circuitry, cause the apparatus at least:
to cause transmission of a reconfiguration complete message including a specific cause code for informing the secondary communication network control element.

12. The apparatus according to claim 8, wherein the at least one memory and the instructions are further configured to, with the at least one processing circuitry, cause the apparatus at least:
when the result of the determination is that the multi-connectivity mode is removed,
to trigger a local release of a communication element related context, and
to trigger a release of the multi-connectivity mode for the communication element.

13. The apparatus according to claim 12, wherein the at least one memory and the instructions are further configured to, with the at least one processing circuitry, cause the apparatus at least:

to cause transmission of a release request message to a secondary communication network control element involved in the multi-connectivity mode for triggering a release of the multi-connectivity mode for the communication element, the release request message including a cause value set to a specific value for indicating that the release is caused by a reestablishment of the communication connection of the communication element.

14. The apparatus according to claim 8, wherein the apparatus is included in a communication network control element configured to act as a source node in the communication connection reestablishment by the communication element.

* * * * *